United States Patent
Tanada et al.

(10) Patent No.: US 8,137,635 B2
(45) Date of Patent: Mar. 20, 2012

(54) EXHAUST GAS PURIFICATION DEVICE FOR INTERNAL COMBUSTION ENGINE

(75) Inventors: Hiroshi Tanada, Nagoya (JP); Maynko Suwa, Okazaki (JP); Koichi Taniyama, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 692 days.

(21) Appl. No.: 12/323,173

(22) Filed: Nov. 25, 2008

(65) Prior Publication Data

US 2009/0208383 A1    Aug. 20, 2009

(30) Foreign Application Priority Data

Feb. 20, 2008 (JP) ............................... P.2008-038722

(51) Int. Cl.
*B01D 50/00* (2006.01)
(52) U.S. Cl. ............... 422/177; 60/272; 60/282; 60/299
(58) Field of Classification Search ................... 422/171, 422/173, 177, 180; 60/272, 282, 299
See application file for complete search history.

(56) References Cited

U.S. PATENT DOCUMENTS

| | | | |
|---|---|---|---|
| 6,878,354 B1 * | 4/2005 | Mitsuda et al. | 422/211 |
| 7,735,313 B2 * | 6/2010 | Osumi et al. | 60/285 |
| 2005/0255993 A1 | 11/2005 | Tanaka et al. | |
| 2007/0191219 A1 * | 8/2007 | Fujita et al. | 502/302 |
| 2007/0196246 A1 * | 8/2007 | Yano | 422/177 |
| 2009/0163354 A1 * | 6/2009 | Andy et al. | 502/66 |

FOREIGN PATENT DOCUMENTS

| | | |
|---|---|---|
| CN | 1488436 A | 4/2004 |
| JP | 3903925 B2 | 4/2007 |
| JP | 2007-224747 A | 9/2007 |
| JP | 2007-309624 A | 11/2007 |
| WO | WO-2006/021337 A1 | 3/2006 |
| WO | WO-2006/021338 A1 | 3/2006 |
| WO | WO-2007/058867 A1 | 5/2007 |
| WO | WO-2007/143837 A1 | 12/2007 |

OTHER PUBLICATIONS

Database WPI Week 200762, Thomson Scientific, London, GB, 2007-663413 XP-002522369.
Neeft, J.P.A., et al., "Catalysts for the Oxidation of soot from diesel exhaust gases, II Contact between soot and catalyst under pratical conditions" Applied Catalysis B: Environmental, vol. 12, No. 1, May 1997, pp. 21-31. XP-022228181.

* cited by examiner

*Primary Examiner* — Nina Bhat
(74) *Attorney, Agent, or Firm* — Birch, Stewart, Kolasch & Birch, LLP

(57) ABSTRACT

An exhaust gas purification device for an internal combustion engine, provided in an exhaust passage of the internal combustion engine, includes: a filter-shape carrier adapted to trap particulate matter in exhaust gas; and an oxidation catalyst supported on the filter-shape carrier and comprising: a particulate oxygen storage material; and an oxygen ion conductive material supported around the oxygen storage material in surface contact therewith.

5 Claims, 4 Drawing Sheets

EXHAUST GAS PURIFICATION DEVICE FOR INTERNAL COMBUSTION ENGINE

BACKGROUND OF THE INVENTION 1. Field of the Invention

The present invention relates to an exhaust gas purification device for an internal combustion engine. Specifically, it relates to art for trapping and removing PM (particulate matter) contained in exhaust gas of a diesel engine 2. Description of the Related Art In a diesel engine, in order to trap and remove PM containing carbon as a main component contained in exhaust gas, DPF (diesel particulate filter) has been widely used as an exhaust gas purification device. In such DPF, when PM deposits, a trapping function decreases and also pressure loss increases. Consequently, a catalyst to promote the oxidation action of PM is supported on DPF and PM is oxidized (burned) and discharge in the form of carbon dioxide to remove PM, thereby DPF being regenerated. As the catalyst for use in PDF, platinum has been widely adopted. Also, in order to achieve a stable oxidation reaction, it is common to add an oxygen storage material such as ceria or zirconia to the catalyst.

However, recently, since the price of platinum rises steeply, a material that may be substituted for platinum has been investigated as one countermeasure. For example, an oxygen ion conductive material such as a perovskite type oxide has been proposed (refer to JP-A-2007-224747).

However, the oxygen ion conductive material as stated above is poor in oxidation performance as compared with platinum and particularly at a high temperature region, there is a risk that carbon monoxide may be generated as a result of insufficient oxidation of PM.

SUMMARY OF THE INVENTION

It is therefore an object of the invention to provide an exhaust gas purification device for an internal combustion engine that uses an oxygen ion conductive material as a catalyst material and traps particulate matter in exhaust gas, in which a sufficient oxidation performance is obtained and discharge of carbon monoxide is suppressed.

In order to achieve the object, according to the invention, there is provided an exhaust gas purification device for an internal combustion engine, provided in an exhaust passage of the internal combustion engine, comprising:

a filter-shape carrier adapted to trap particulate matter in exhaust gas; and an oxidation catalyst supported on the filter-shape carrier and comprising;

a particulate oxygen storage material; and an oxygen ion conductive material supported around the oxygen storage material in surface contact therewith.

The oxygen ion conductive material may have a film form covering a periphery of the oxygen storage material.

A crack reaching the oxygen storage material in the oxygen ion conductive material may be formed on the oxygen ion conductive material.

An outer diameter of the oxygen storage material may be 5 μm or less, and a thickness or an outer diameter of the oxygen ion conductive material may be 30% or less of the outer diameter of the oxygen storage material.

An outer diameter of the oxygen storage material may be a value represented by the following calculation expression:

Outer Diameter of Oxygen Storage Material=Particle Volume V ($cm^3$/g)÷Particle Surface Area S ($cm^2$/g)×6

A volume of the oxygen ion conductive material may be 3 times or less a volume of the oxygen storage material.

The oxygen ion conductive material may be a perovskite type oxide.

DETAILED DESCRIPTION OF THE INVENTION

The following will describe an embodiment of the invention based on drawings.

Figure 1:
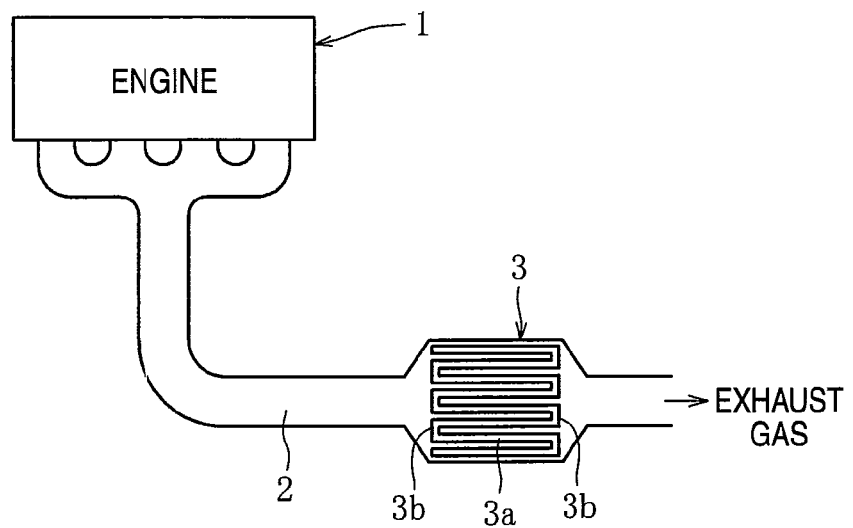
FIG. 1 is a schematic block diagram of an exhaust system of an engine to which an exhaust gas purification device of the invention is applied.

FIG. 1 is a schematic block diagram of an exhaust system of an engine (internal combustion engine) to which an exhaust gas purification device of the invention is applied.

The engine 1 is a diesel engine and DPF 3 is fixed along an exhaust tube 2 of the engine. DPF 3 is, for example, formed with closing the upstream side and the downstream side of the passage of a honeycomb carrier 3a alternatively with a plug 3b and has a function of trapping PM in exhaust gas. The carrier 3a has a porous structure formed of cordierite or the like and an oxidation catalyst is supported on the wall surface thereof to form an oxidation catalyst layer.

Figure 2:
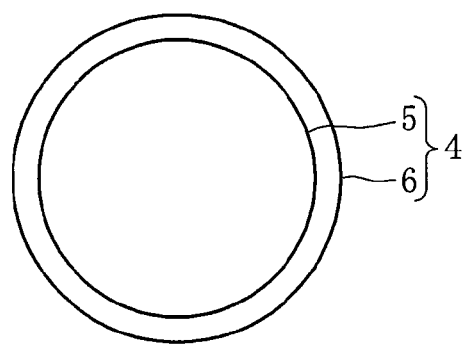
FIG. 2 is a schematic diagram showing the constitution of an oxidation catalyst according to the first embodiment of the invention.

FIG. 2 is a schematic diagram showing the constitution of an oxidation catalyst 4 according to the first embodiment of the invention. The oxidation catalyst 4 supported on the carrier 3a comprises an oxygen storage material 5 and an oxygen ion conductive material 6. The oxygen storage material 5 has a function of occluding and discharging oxygen and, for example, a ceria compound such as $CeO_2$, Ce—Zr—Bi, or Ce—Pr is used. The oxygen ion conductive material 6 is a substance having oxygen and capable of easy delivery from and to an adjacent substance and, for example, a perovskite type composite oxide containing an alkaline earth metal, such as $LaSrMnO_3$, $LaSrFeO_3$, $LaBaFeO_3$, or $LaBaMnO_3$ is used.

In the first embodiment of the invention, as shown in FIG. 2, the oxidation catalyst 4 is formed so that the oxygen ion conductive material 6 covers a periphery of the particulate oxygen storage material 5 in a thin film form. It is preferred to adjust the diameter of the oxygen storage material 5 to about 5 μm, preferably about 1 to 2 μm and the thickness of the oxygen ion conductive material 6 to about 1% of the diameter of the oxygen storage material 5.

Moreover, in the case where the particle shape of the oxygen storage material is not spherical, it is suitable to use a value represented by an expression: volume÷particle surface area×6, as the outer diameter of the particle. As the volume, a true density determined by pycnometetry (gas phase substitution method) is used and, as the surface area, a specific surface area by the use of a BET method may be used.

Figure 3:
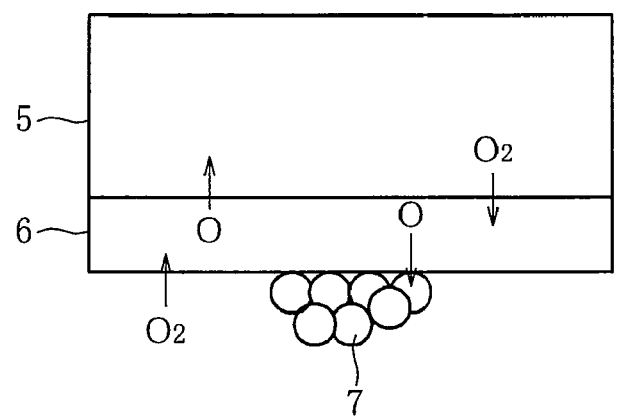
FIG. 3 is an enlarged view of a surface layer part of the oxidation catalyst.

FIG. 3 is an enlarged view of a surface layer part of the oxidation catalyst 4.

In DPF 3 having the oxidation catalyst 4 of the above constitution, as shown in FIG. 3, oxygen in the exhaust gas is occluded in the oxygen storage material 5 through the oxygen ion conductive material 6. On the other hand, PM 7 containing carbon as a main component attached to the surface of the oxygen ion conductive material 6 is oxidized with oxygen supplied from the oxygen ion conductive material 6. Therefore, PM 7 deposited on DPF 3 is discharged in the form of carbon dioxide and removed from DPF 3. Moreover, oxygen in the oxygen ion conductive material 6 is consumed through the supply of oxygen from the oxygen ion conductive material 6 to PM but oxygen is supplied to the oxygen ion conductive material 6 from the oxygen storage material 5, so that oxygen deficiency is avoided and continuous oxidation becomes possible.

Since the present embodiment has a constitution that the oxygen ion conductive material 6 covers a periphery of the oxygen storage material 5, the contact area between the oxygen storage material 5 and the oxygen ion conductive material 6 is sufficiently secured and oxygen is efficiently supplied from the oxygen storage material 5 to the oxygen ion conductive material 6. Therefore, it is possible to prevent the incomplete oxidation of PM and to suppress the discharge of CO with sufficiently securing the oxidation function.

Figure 4:
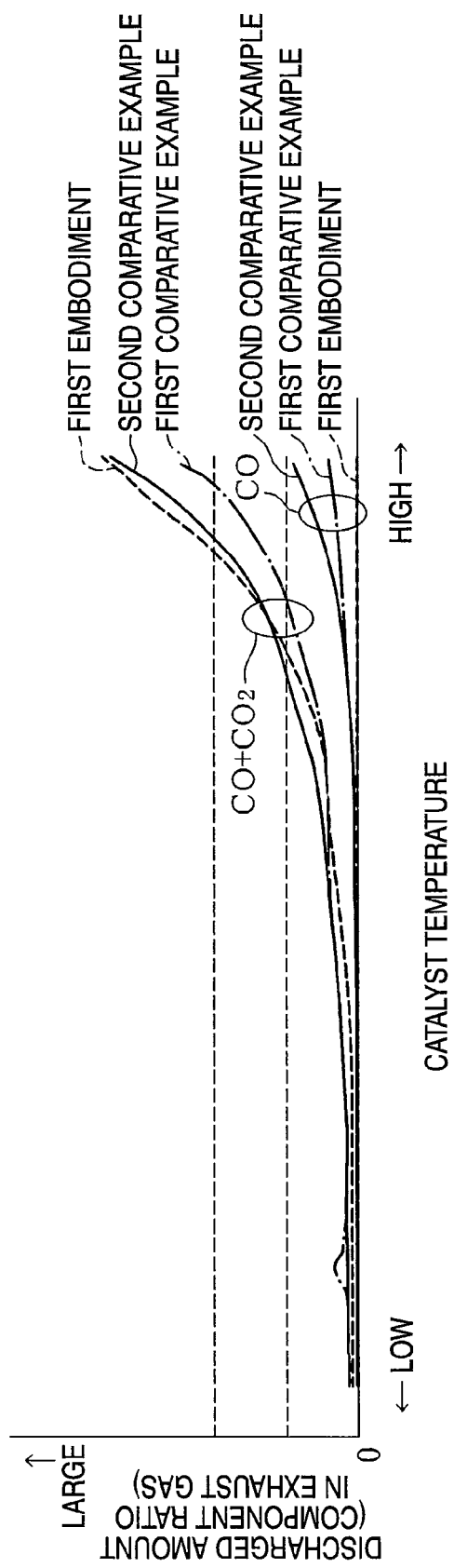
FIG. 4 is a graph showing combustion properties of PM in DPF.

FIG. 4 is a graph showing combustion properties of PM (carbon) in DPF 3. Specifically, it shows total discharged amounts of CO and $CO_2$ according to catalyst temperature and discharged amounts of CO (component ratio in exhaust gas).

Figure 5:
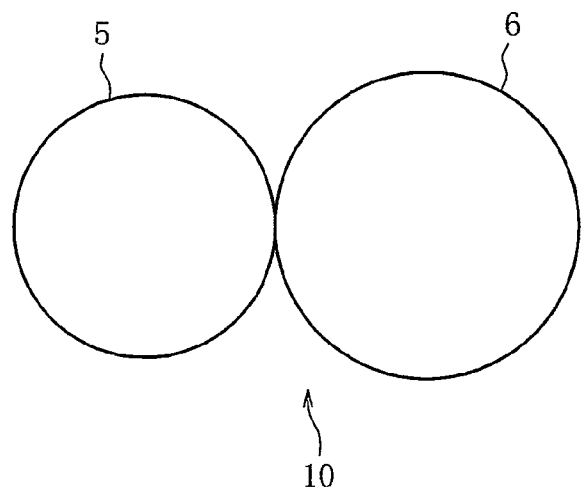
FIG. 5 is a schematic diagram showing the constitution of an oxidation catalyst of related art.

In the present graph, in addition to the above first embodiment, two kinds of combustion properties in DPF using related art are also shown as Comparative Examples. FIG. 5 is a schematic diagram showing a constitution of the oxidation catalyst 10 of related art that is first Comparative Example. As shown in FIG. 5, in the oxidation catalyst 10 of the related art, not only the oxygen storage material 5 but also oxygen ion conductive material 6 have a particulate shape and the oxygen storage material 5 is in contact with the oxygen ion conductive material 6 but the contact area thereof is remarkably small as compared with the case of the oxidation catalyst 4 of the present embodiment. Therefore, it is difficult for the oxidation catalyst 10 to achieve efficient supply of oxygen between the oxygen storage material 5 and the oxygen ion conductive material 6. Second Comparative Example is the case where only the oxygen ion conductive material 6 is used as an oxidation catalyst.

As shown in FIG. 4, in DPF 3 of the present embodiment, even in a high temperature region, the emission amount of CO is remarkably low as compared with the cases of the first Comparative Example and the second Comparative Example and is almost zero, so that it is found that PM is completely burned. Moreover, the emission amount of $CO+CO_2$ is not decreased contrarily to the case of the related-art example (first Comparative Example) where the oxygen ion conductive material 6 is particulate and thus it is found that oxidation performance is sufficiently secured.

Furthermore, since the present embodiment has such a constitution that the oxygen ion conductive material 6 covers a periphery of the oxygen storage material 5, the volume of the oxidation catalyst 4 can be reduced as compared with the related-art example (first comparative Example) where the oxygen ion conductive material 6 is particulate. Accordingly, pressure loss in DPF 3 can be reduced.

Furthermore, in the present embodiment, since an oxygen storage material 5 having a low heat resistance can be adopted when it is covered with an oxygen ion conductive material 6 having a high heat resistance, material costs can be reduced.

Figure 6:
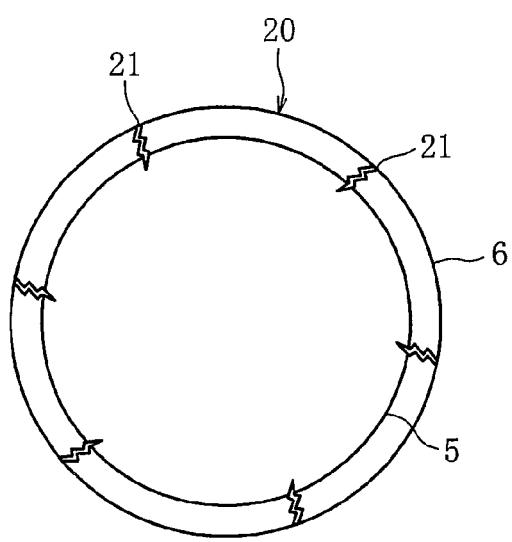
FIG. 6 is a schematic diagram showing the constitution of an oxidation catalyst according to the second embodiment of the invention.

FIG. 6 is a schematic diagram showing the constitution of the oxidation catalyst 20 according to the second embodiment of the invention.

In the oxidation catalyst 20 according to the second embodiment of the invention, cracks 21 are additionally formed at several portions on the oxygen ion conductive material 6 of the oxidation catalyst 4 of the first embodiment of the invention. The deepest parts of the cracks 21 reach the oxygen storage material 5.

By thus forming the cracks, since the exhaust gas can directly come into contact with the oxygen storage material 5 in the present embodiment, the supply of oxygen from the exhaust gas to the oxygen storage material 5 becomes more efficient, so that oxidation ability in the oxidation catalyst 20 can be improved.

The following will describe a method of forming the above oxidation catalysts 4 and 20.

For forming the catalysts so that the oxygen ion conductive material 6 covers a periphery of the oxygen storage material 5 as described in the above embodiments, it is possible to utilize an organic complex method.

The organic complex method is related art for forming a coating film from an aqueous solution containing a low-molecular-weight metal complex and an alkylamine. Specifically, an aqueous metal chloride solution is mixed with ethylenediamine tetraacetic acid, tributylamine, and an aqueous hydrogen peroxide solution to form a tributylammonium salt of a metal complex. Then, ethanol is added thereto and mixed to form an organic complex solution and the solution is subjected to flow coating and baked to form a thin film of a metal oxide. Thus, by utilizing the organic complex method, there can be easily produced an oxidation catalyst wherein a thin-film oxygen ion conductive material covers a periphery of the oxygen storage material.

Moreover, when an organic substance such as polyethylene glycol is mixed with the complex solution, the organic substance burns at the baking and cracks can be formed in the oxygen ion conductive material. Thereby, the above second embodiment can be easily realized.

In this connection, it is not necessary that the oxygen ion conductive material 6 homogeneously covers a periphery of the oxygen storage material 5 and a part of the oxygen storage material 5 may be exposed. By such a constitution, the supply of oxygen from the exhaust gas to the oxygen storage material 5 can be efficiently achieved as in the case of the above oxidation catalyst 20.

Figure 7:
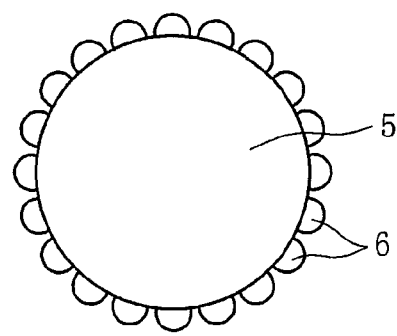
FIG. 7 is a schematic diagram showing the constitution of an oxidation catalyst according to the other embodiment of the invention.

Furthermore, as shown in FIG. 7, the catalyst may be formed so that particulate oxygen ion conductive material 6 is supported around the oxygen storage material 5. In this case, when the oxygen ion conductive material 6 is formed so as to be in surface contact with the oxygen storage material 5, the supply of oxygen between the oxygen storage material 5 and the oxygen ion conductive material 6 can be efficiently achieved.

The oxygen ion conductive material 6 is not limited to the above perovskite type oxide. For example, a substance which actively perform oxygen ion delivery, such as a perovskite type oxide (laGaO$_3$) or an irregular pyrochlore oxide (Ln$_2$Zn$_2$O$_7$) can be adopted in the invention.

According to an aspect of the invention, particulate matter containing carbon as a main component trapped on a support is oxidized with oxygen supplied from an oxygen ion conductive material, discharged as carbon dioxide, and thus removed from the support. Since oxygen is supplied from an oxygen storage material to the oxygen ion conductive material, oxygen insufficiency in the oxygen ion conductive material is solved and continuous oxidative removal of the particulate matter becomes possible. Particularly, in the present application, since the oxygen ion conductive material is supported around the oxygen storage material in surface contact therewith, large contact area between the oxygen storage material and the oxygen ion conductive material is secured and oxygen is efficiently supplied from the oxygen storage material to the oxygen ion conductive material. Therefore, it becomes possible to achieve efficient oxidation of the particulate matter attached to the oxygen ion conductive material and hence incomplete oxidation of the particulate matter can be prevented even in a high-temperature region to suppress the discharge of carbon monoxide with sufficient removal of the particulate matter.

According to an aspect of the invention, since the oxygen ion conductive material is formed in a film form that covers a periphery of the oxygen storage material, larger contact area between the oxygen storage material and the oxygen ion conductive material is secured and oxygen is more efficiently supplied from the oxygen storage material to the oxygen ion conductive material.

According to an aspect of the invention, since exhaust gas can come into direct contact with the oxygen storage material by passing through cracks which reach the oxygen storage material, oxygen in the exhaust gas is efficiently supplied to the oxygen storage material. Therefore, even when oxygen is supplied from the oxygen storage material to the particulate matter through the oxygen ion conductive material, oxygen insufficiency can be suppressed.

According to an aspect of the invention, there can be realized an oxidation catalyst which enables efficient supply of oxygen from the oxygen storage material to the oxygen ion conductive material.

According to an aspect of the invention, even when the oxygen storage material is an oxygen storage material having a geometric particulate shape, there can be realized an oxidation catalyst which enables efficient supply of oxygen from the oxygen storage material to the oxygen ion conductive material.

According to an aspect of the invention, a volume ratio of the oxygen storage material to the oxygen ion conductive material becomes suitable and there can be realized an oxidation catalyst which enables efficient supply of oxygen to the oxygen ion conductive material.

According to an aspect of the invention, since the oxygen ion conductive material is a perovskite type oxide, there can be realized an exhaust gas purification device wherein costs are suppressed without using an expensive material such as platinum.

What is claimed is:

1. An exhaust gas purification device for an internal combustion engine, provided in an exhaust passage of the internal combustion engine, comprising:
    a filter-shape carrier adapted to trap particulate matter in exhaust gas; and
    an oxidation catalyst supported on the filter-shape carrier and comprising:
        a particulate oxygen storage material; and
        an oxygen ion conductive material supported around the oxygen storage material in surface contact therewith,
    wherein the oxygen ion conductive material has a film form covering a periphery of the oxygen storage material, and
    wherein a crack reaching the oxygen storage material in the oxygen ion conductive material is formed on the oxygen ion conductive material.

2. The exhaust gas purification device according to claim 1, wherein
    an outer diameter of the oxygen storage material is 5 μm or less, and
    a thickness or an outer diameter of the oxygen ion conductive material is 30% or less of the outer diameter of the oxygen storage material.

3. The exhaust gas purification device according to claim 1, wherein an outer diameter of the oxygen storage material is a value represented by the following calculation expression:
    Outer Diameter of Oxygen Storage Material=Particle Volume V (cm$^3$/g)÷Particle Surface Area S (cm$^2$/g)×6.

4. The exhaust gas purification device according to claim 1, wherein a volume of the oxygen ion conductive material is 3 times or less a volume of the oxygen storage material.

5. The exhaust gas purification device according to claim 1, wherein the oxygen ion conductive material is a perovskite type oxide.

\* \* \* \* \*